US012405506B2

(12) United States Patent
Liang et al.

(10) Patent No.: US 12,405,506 B2
(45) Date of Patent: Sep. 2, 2025

(54) ARTICLE INCLUDING LIGHT VALVES

(71) Applicant: VIAVI SOLUTIONS INC., Chandler, AZ (US)

(72) Inventors: Kangning Liang, Santa Rosa, CA (US); Jaroslaw Zieba, Santa Rosa, CA (US); Johannes P. Seydel, Petaluma, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 18/446,335

(22) Filed: Aug. 8, 2023

(65) Prior Publication Data
US 2024/0019754 A1 Jan. 18, 2024

Related U.S. Application Data

(63) Continuation of application No. 16/222,710, filed on Dec. 17, 2018, now Pat. No. 11,740,532.

(51) Int. Cl.
G02B 26/00 (2006.01)
G02B 5/128 (2006.01)
G02B 5/22 (2006.01)
G02F 1/01 (2006.01)
G02F 1/17 (2019.01)

(52) U.S. Cl.
CPC .............. *G02F 1/17* (2013.01); *G02B 5/128* (2013.01); *G02B 5/223* (2013.01); *G02F 2201/34* (2013.01)

(58) Field of Classification Search
CPC .......... G02B 5/128; G02B 5/223; G02F 1/17; G02F 2201/34

USPC ................ 359/529, 530, 534–542, 580–590
See application file for complete search history.

(56) References Cited

U.S. PATENT DOCUMENTS

| 4,025,665 | A | 5/1977 | Hannon |
| 4,359,504 | A | 11/1982 | Troy |
| 4,434,010 | A | 2/1984 | Ash |
| 4,479,995 | A | 10/1984 | Suzuki et al. |
| 4,755,229 | A | 7/1988 | Armanini |
| 4,772,331 | A | 9/1988 | Noguchi et al. |
| 4,814,208 | A | 3/1989 | Miyazaki et al. |
| 4,954,175 | A | 9/1990 | Ito et al. |
| 5,017,638 | A | 5/1991 | Handa et al. |
| 5,026,429 | A | 6/1991 | Mronga et al. |
| 5,116,664 | A | 5/1992 | Kimura et al. |
| 5,135,812 | A | 8/1992 | Phillips et al. |
| 5,192,609 | A | 3/1993 | Carroll, Jr. |

(Continued)

FOREIGN PATENT DOCUMENTS

| CH | 691750 | 9/2001 |
| CN | 101654030 A | 2/2010 |

(Continued)

OTHER PUBLICATIONS

English Abstract for RD 400055 A, Aug. 1997, 2 pages.

*Primary Examiner* — Mahidere S Sahle
(74) *Attorney, Agent, or Firm* — Mannava & Kang, P.C.

(57) ABSTRACT

An article, includes a layer including at least one color-rendering portion and at least one light valve; and a metal reflector portion, wherein the at least one light valve is positioned in the layer to provide reflection of incident light through the at least one light valve. A method of making an article is also disclosed.

21 Claims, 5 Drawing Sheets

(56) References Cited

U.S. PATENT DOCUMENTS

| | | |
|---|---|---|
| 5,238,492 A | 8/1993 | Itoh et al. |
| 5,308,394 A | 5/1994 | Minohara et al. |
| 5,487,939 A | 1/1996 | Phillips et al. |
| 5,573,584 A | 11/1996 | Ostertag et al. |
| 5,650,002 A | 7/1997 | Bolt |
| 5,886,069 A | 3/1999 | Bolt |
| 6,063,179 A | 5/2000 | Schmid et al. |
| 6,156,115 A | 12/2000 | Pfaff et al. |
| 6,157,489 A | 12/2000 | Bradley, Jr. et al. |
| 6,325,847 B1 | 12/2001 | Christie et al. |
| 6,376,075 B1 | 4/2002 | Tacke-Willemsen et al. |
| 6,398,999 B1 | 6/2002 | Josephy et al. |
| 6,432,535 B1 | 8/2002 | Noguchi et al. |
| 6,508,876 B1 | 1/2003 | Bernhardt et al. |
| 6,569,517 B1 | 5/2003 | McGurran et al. |
| 6,569,529 B1 | 5/2003 | Phillips et al. |
| 6,572,784 B1 | 6/2003 | Coombs et al. |
| 6,586,098 B1 | 7/2003 | Coulter et al. |
| 6,686,042 B1 | 2/2004 | LeGallee |
| 6,777,085 B1 | 8/2004 | Argoitia et al. |
| 6,818,297 B1 | 11/2004 | Atarashi et al. |
| 6,958,860 B2 * | 10/2005 | Dontula ............... G02B 5/0242 359/518 |
| 6,967,053 B1 | 11/2005 | Mullen et al. |
| 2001/0031352 A1 | 10/2001 | Yamamori et al. |
| 2002/0114951 A1 | 8/2002 | Horansky |
| 2002/0160194 A1 | 10/2002 | Phillips et al. |
| 2003/0051634 A1 | 3/2003 | Takahashi |
| 2003/0059598 A1 | 3/2003 | Norris et al. |
| 2003/0072961 A1 | 4/2003 | Fuller et al. |
| 2003/0104206 A1 | 6/2003 | Argoitia et al. |
| 2003/0148093 A1 | 8/2003 | Gorny et al. |
| 2003/0190473 A1 | 10/2003 | Argoitia et al. |
| 2003/0224164 A1 | 12/2003 | Argoitia et al. |
| 2004/0115432 A1 | 6/2004 | Zimmermann et al. |
| 2004/0237844 A1 | 12/2004 | Pfaff et al. |
| 2004/0244640 A1 | 12/2004 | Vogt et al. |
| 2005/0095420 A1 | 5/2005 | Berni et al. |
| 2005/0147799 A1 | 7/2005 | Bordener |
| 2005/0204958 A1 | 9/2005 | Kuebelbeck et al. |
| 2005/0277704 A1 | 12/2005 | Edwards et al. |
| 2005/0287030 A1 | 12/2005 | Kishimoto et al. |
| 2006/0144294 A1 | 7/2006 | Misaki et al. |
| 2006/0175855 A1 | 8/2006 | Yamamoto |
| 2006/0188700 A1 | 8/2006 | Yukawa et al. |
| 2006/0227408 A1 | 10/2006 | Miles |
| 2006/0228553 A1 | 10/2006 | Argoitia et al. |
| 2006/0267241 A1 | 11/2006 | Argoitia |
| 2007/0134179 A1 | 6/2007 | Ino et al. |
| 2007/0184268 A1 | 8/2007 | Kishimoto et al. |
| 2008/0081207 A1 | 4/2008 | Ohsaki et al. |
| 2008/0102269 A1 | 5/2008 | Herzing et al. |
| 2008/0239497 A1 | 10/2008 | Lippey |
| 2008/0249209 A1 | 10/2008 | Trummer et al. |
| 2008/0295737 A1 | 12/2008 | Henglein et al. |
| 2009/0017082 A1 | 1/2009 | Morimitsu et al. |
| 2009/0081460 A1 | 3/2009 | Argoitia et al. |
| 2009/0155498 A1 | 6/2009 | Nakashima et al. |
| 2009/0208664 A1 | 8/2009 | Iijima et al. |
| 2009/0274909 A1 | 11/2009 | Bergevin et al. |
| 2010/0142052 A1 | 6/2010 | Hwang et al. |
| 2010/0180796 A1 | 7/2010 | Kitamura et al. |
| 2011/0117324 A1 | 5/2011 | Ito et al. |
| 2011/0291113 A1 | 12/2011 | Chamberlin |
| 2011/0293547 A1 | 12/2011 | Geissler et al. |
| 2013/0131187 A1 | 5/2013 | Hashizume et al. |
| 2013/0164529 A1 | 6/2013 | Yu et al. |
| 2014/0254037 A1 | 9/2014 | Faure et al. |
| 2014/0285892 A1 | 9/2014 | Sauvage-Vincent et al. |
| 2015/0185375 A1 | 7/2015 | Hannington |
| 2015/0290713 A1 | 10/2015 | Olejnik et al. |
| 2016/0075165 A1 | 3/2016 | MacHizaud et al. |
| 2017/0075046 A1 | 3/2017 | Han et al. |
| 2017/0369709 A1 | 12/2017 | Seydel et al. |
| 2018/0133116 A1 | 5/2018 | Hioki |
| 2018/0133753 A1 | 5/2018 | Landa et al. |
| 2018/0155551 A1 | 6/2018 | Horiguchi et al. |
| 2018/0171149 A1 | 6/2018 | Raksha et al. |
| 2018/0304305 A1 | 10/2018 | Yamane et al. |
| 2019/0047270 A1 | 2/2019 | Yamane et al. |
| 2019/0170916 A1 * | 6/2019 | Nishimura ............ A41D 13/01 |
| 2019/0270291 A1 | 9/2019 | Aridomi et al. |
| 2020/0004101 A1 | 1/2020 | Kozlowski et al. |
| 2020/0041703 A1 | 2/2020 | Yasuda et al. |
| 2020/0123387 A1 | 4/2020 | Horiguchi |
| 2020/0192177 A1 | 6/2020 | Liang et al. |
| 2020/0341180 A1 * | 10/2020 | Chen-Ho ............... G02B 5/124 |

FOREIGN PATENT DOCUMENTS

| | | |
|---|---|---|
| DE | 2443314 B1 | 10/1975 |
| DE | 4134600 A1 | 4/1993 |
| DE | 102005050094 A1 | 4/2007 |
| DE | 102009023157 A1 | 12/2010 |
| EP | 0892023 A1 | 1/1999 |
| EP | 1728624 A1 | 12/2006 |
| EP | 1859311 B1 | 11/2008 |
| EP | 3862472 A1 | 8/2021 |
| JP | S63197638 A | 8/1988 |
| JP | H0232170 A | 2/1990 |
| JP | H0269572 A | 3/1990 |
| JP | H04277254 A | 10/1992 |
| JP | H04286816 A | 10/1992 |
| JP | 2000313823 A | 11/2000 |
| JP | 2003155422 A | 5/2003 |
| JP | 2003340985 A | 12/2003 |
| JP | 2005205262 A | 8/2005 |
| JP | 2006035160 A | 2/2006 |
| JP | 2006281451 A | 10/2006 |
| JP | 2006299051 A | 11/2006 |
| JP | 2009208154 A | 9/2009 |
| JP | 2011180562 A | 9/2011 |
| JP | 2012118321 A | 6/2012 |
| JP | 2012218325 A | 11/2012 |
| JP | 2015066855 A | 4/2015 |
| JP | 2018173556 A | 11/2018 |
| TW | 201801936 A | 1/2018 |
| WO | 0023257 A1 | 4/2000 |
| WO | 0129587 A1 | 4/2001 |
| WO | 2004055118 A2 | 7/2004 |
| WO | 2010125885 A1 | 11/2010 |
| WO | 2013126361 A1 | 8/2013 |
| WO | 2015175024 A2 | 11/2015 |
| WO | 2017010055 A1 | 1/2017 |

* cited by examiner

US 12,405,506 B2

ARTICLE INCLUDING LIGHT VALVES

PRIORITY

This patent application is a Continuation of under 35 U.S.C. § 120 of co-pending U.S. patent application Ser. No. 16/222,710, filed Dec. 17, 2018, the disclosure of which is hereby incorporated by reference in its entirety.

FIELD OF THE INVENTION

The present disclosure generally relates to articles, such as optical devices in the form of foil, sheets, and/or flakes. The article can include a layer including at least one color-rendering portion and at least one light valve; and a metal reflector portion; wherein the at least one light valve is positioned in the layer to provide reflection of incident light through the at least one light valve. Methods of making the optical devices are also disclosed.

BACKGROUND OF THE INVENTION

A color-rendering layer contains colorant particles that can absorb and/or scatter certain wavelengths of light. The absorption and/or the scattering of light in the color-rendering layer can completely obscure the light from reaching a reflector layer. This results in an article that lacks a metallic sheen. For example, an opaque, such as black, color-rendering layer absorbs all visible light thereby preventing the light from reaching the reflector layer underneath. Because the light does not reach the reflector layer, it is not reflected, and the article does not produce a metallic sheen. As another example, an opaque, such as white, color-rendering layer scatters light and can reach a level of light scattering so that the light does not reach the reflector layer, it is not reflected, and the article does not produce a metallic sheen.

The strength of metallic sheen of an article, such as an optical device, for example, a special effect pigment, is determined by the amount of light reflected by a reflector layer. An article whose reflector layer is fully covered by an opaque color-rendering layer is unable to reflect any incident light and therefore lacks any metallic sheen.

What is needed is an article that includes a layer including at least one color-rendering portion and at least one light valve; and a metal reflector portion that can produce a metallic sheen under differing lighting conditions, such as diffuse lighting and direct lighting.

SUMMARY OF THE INVENTION

In an aspect, there is disclosed an article including a layer including at least one color-rendering portion and at least one light valve; and a metal reflector portion; wherein the at least one light valve is positioned in the layer to provide reflection of incident light through the at least one light valve.

In a further aspect, there is disclosed a method of making an article including coating a first layer including at least one color-rendering portion and at least one light valve onto a substrate; depositing a metal reflector portion onto the first layer; and optionally coating a second layer including at least one color-rendering portion having at least one light valve onto the metal reflector portion.

Additional features and advantages of various embodiments will be set forth, in part, in the description that follows, and will, in part, be apparent from the description, or can be learned by the practice of various embodiments.

The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1A:
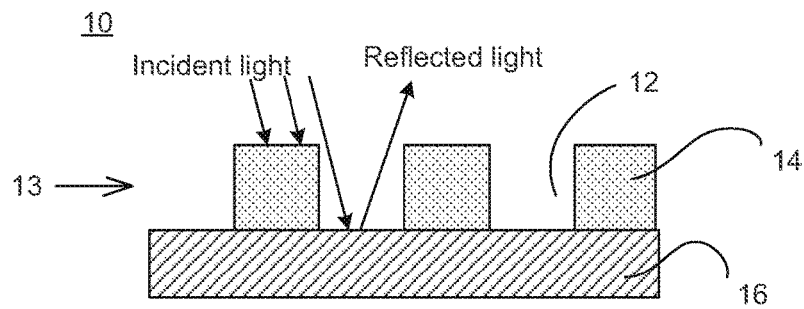
FIG. 1A is a cross-section of an article including a layer including at least one color-rendering portion and at least one light valve, according to an aspect of the present disclosure.

It is to be understood that both the foregoing general description and the following detailed description are exemplary and explanatory only, and are intended to provide an explanation of various embodiments of the present teachings. In its broad and varied embodiments, disclosed herein are articles, such as optical devices, for example, in the form of foils, sheets, and flakes; and a method of manufacturing the article. As shown in FIGS. 1A, 2A, 3A, and 4A, the article 10 can include a layer 13 including at least one color-rendering portion 14 and at least one light valve 12; and a metal reflector portion 16; wherein the at least one light valve 12 is positioned in the layer 13 to provide reflection of incident light through the at least one light valve 12. The at least one light valve 12 is an optical channel through which incident light can reach the metal reflector portion 16.

A "light valve" 12 is a designed optical channel having a geometric shape, size, arrangement, distribution, and material properties. The light valve 12 can be used and placed within one or more layers of an article.

The light valve 12 can be located within a layer 13 having a color-rendering portion 14 to enable incident light to reach the reflector portion 16 and the reflected light to transmit through the light valve 12, as shown in FIG. 1A. A light valve 12 can control the amount, intensity, spectral composition, and direction of the incident light reaching the reflector portion 16. In an aspect, the light valve 12 can control the amount, intensity, spectral composition, and direction of the light reflected from the reflector portion 16. In a further aspect, the light valve 12 can control the amount, intensity, and spectral composition of the scattered or absorbed light by the article 10.

A light valve 12 can be located within a transparent layer 20 to provide an optical channel to a color-rendering portion 14 or a light scattering layer. The transparent layer 20 can be disposed on or external to a color-rendering portion 14. The light valve 12 can enable incident light to reach a color-rendering portion 14 or a light scattering layer and the reflected and/or scattered light to transmit through the optical channel. In an aspect, a reflector portion 16 can be in the transparent layer 20. The reflector portion 16 can form a boundary of the light valve 12.

In this manner, the light valve 12 can be used to tune an article 10, such as an optical device, for example a special effect pigment, that includes a light valve 12 and a reflector portion 16. In an aspect, the light valve 12 can enhance a metallic sheen of the article 10, for example under a diffuse lighting condition, and/or reduce a metallic sheen, for example under a direct lighting condition.

As shown in FIGS. 1A-1D, 2A, and 2B, the at least one light valve 12 can be a void area in the layer 13. A void area can be an absence of material to create an empty space and thereby an optical channel.

The light valve 12 can be any dimension (size or shape) so long as incident light is allowed to pass through the light valve 12 to be reflected by a reflector portion 16. In an aspect, the at least one light valve 12 is dimensioned to allow incident light to pass through the at least one light valve 12. Depending upon the dimension of the at least one light valve 12 and the angle of the incident light, the amount of incident light that passes through the light valve 12 and is reflected by the reflector portion 16 may vary. For example, a larger dimensioned light valve 12 is more likely to allow incident light to pass through and be reflected by the reflector portion 16, regardless of the angle of the incident light, as shown in FIG. 1A. Additionally, a smaller dimensioned light valve 12 is less likely to allow incident light to pass through and be reflected by the reflector portion 16, as shown in FIG. 1C.

Figure 1B:
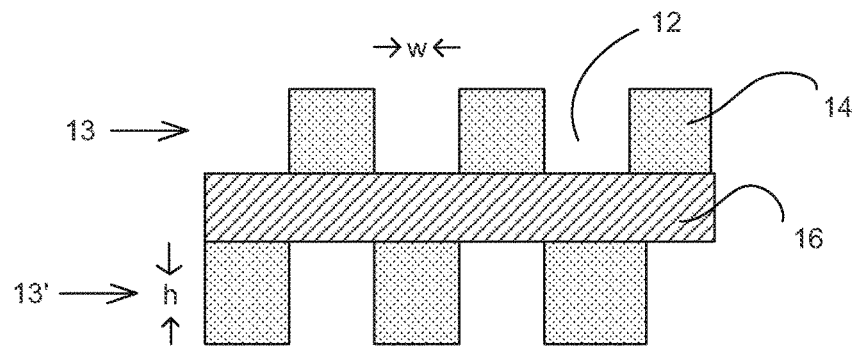
FIGS. 1B-1D are cross-sections of an article, according to other aspects of the present disclosure.
Figure 1C:
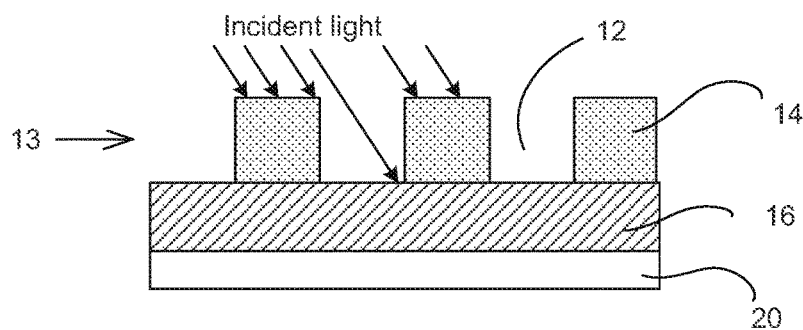

The light valve 12 can have a width w and a height h, as shown in FIG. 1B. The width w can be any size, but is less than an entire width of the layer 13 that includes the at least one light valve 12. The width w can be small enough so that the at least one light valve 12 is a plurality of light valves 12 spaced throughout the layer 13. The height h of the at least one light valve 12 can be any size, but in most cases, can be at least the same height (if not greater than) as the layer 13. In another aspect, the at least one light valve 12 can extend through at least a portion of a thickness (a portion of a height) of the layer 13.

The at least one light valve 12 can be a three-dimensional shape with flat polygonal or circular faces. As shown in FIGS. 1A-1D, the at least one light valve 12 can be a three-dimensional polygon, such as a square, diamond, or rectangle. The at least one light valve 12 can be a three-dimensional column. The three-dimensional shape of the at least one light valve 12 can be a void area. The three-dimensional shape of the at least one light valve 12 can be the same height as the layer 13 or can extend beyond a height of the layer 13.

As shown in FIGS. 1B, 3C-3E, 4C, and 4D, a plurality of light valves 12 can be present in the layer 13, such as a first layer 13 and a second layer 13'. In an aspect, a light valve 12 can be adjacent to a color-rendering portion 14 on a first side and adjacent to a metal reflector portion 16 on another side. In the instance of a plurality of light valves 12, they can be present in a random pattern or in a designed pattern, such as an array.

Figure 2A:
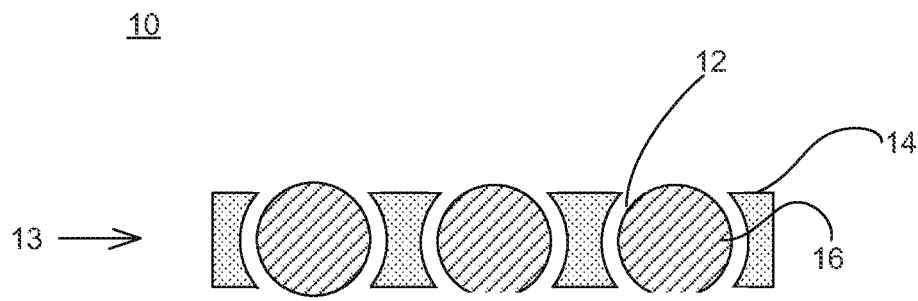
FIGS. 2A-B are cross-sections of an article including a layer including at least one color-rendering portion and at least one light valve, according to another aspect of the present disclosure.
Figure 2B:
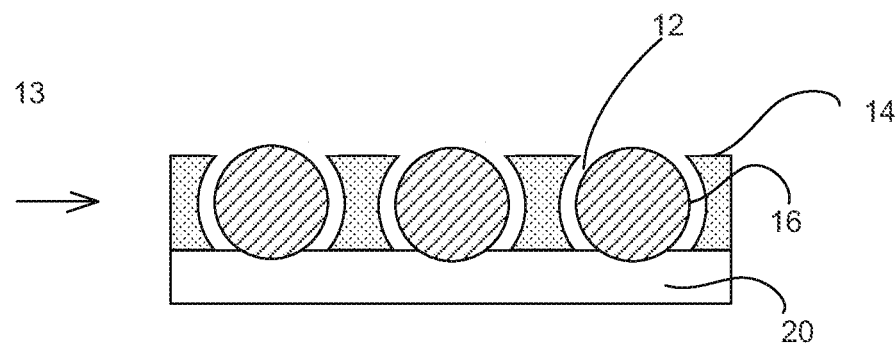

In another aspect, as shown in FIGS. 2A-2B, the at least one light valve 12 can be a void area around a three-dimensional shape, such as the round shape of the metal reflector portion 16.

As shown in FIGS. 2A-2B, a portion of the at least one light valve 12 can extend above a surface of the layer 13. In this manner, a metallic sheen of the article 10 can be increased, such as during exposure to diffuse lighting (e.g., cloudy day), because a portion of incident light can become collimated. Under certain lighting conditions, the amount and the direction of reflected light can be determined by the curvature (the diameter) of the curved metal reflector 16 and the exposed area of the curved metal reflector 16 above a surface of the layer 13. When a direct or a collimated light is shone on the curved metal reflector 16, the reflected light becomes divergent, implying reduced sheen from the article 10. In the case where the article 10 is shone by a direct incident light perpendicular to the surface, i.e., at 0 degrees incident angle, the majority of the light is reflected off the curved metal reflector 16 at various angles depending on the reflecting location on the curved metal reflector 16. This indicates that there is less amount of reflection and hence less sheen along the normal direction.

As shown in FIGS. 3A-3E, the at least one light valve 12 can be a transparent material. The refractive index of the transparent material can affect the angles of the incident and reflected light passing through the at least one light valve 12. The transparent material can have any dimension discussed above. In an aspect, as shown in FIGS. 3A-3E, the at least one light valve 12 can be a three-dimensional round shape, such as a bead. For example, the at least one light valve 12 can be a bead of a transparent material with a defined geometry that is included within the layer 13, such as the first layer 13 and the second layer 13'. The at least one light valve 12 can be a bead chosen from polystyrene and silica. A diameter of the bead can be greater than or equal to a height of the layer 13, such as the first layer 13 and/or the second layer 13'. Non-limiting examples of the transparent material include a clear resin, polystyrene, polyvinyl acetate, polyacrylates, polymethacrylates, polyurethanes, polyesters, polycarbonates, polyamides, polyimides, polyvinyl chloride, silicones, epoxy resins.

In an aspect, the beads can be dissolved by a solvent to form a void area (e.g., an air-filled area). For example, after construction of the article 10, the beads can be dissolved by a solvent, such as water. The void areas can then be filled with a transparent resin. In another aspect, the beads can be polystyrene, which can be dissolved by toluene to form the light valves 12.

The article 10, as shown in the Figures, can include a metal reflector portion 16. The metal reflector portion 16 can be dimensioned to reflect light through the at least one light valve 12 present in the layer 13. In an aspect, the metal reflector portion 16 can be a layer, as shown in FIGS. 1A-1D and 3A-4D. The metal reflector portion 16 can be adjacent to at least one light valve 12, such as a plurality of light valves 12. The metal reflector portion 16 can be in a layer and between at least one light valve on a first surface and on a second surface. In this manner, at least one light valve 12 can pass light through to the metal reflector portion 16 on either surface of the metal reflector portion 16.

In another aspect, the metal reflector portion 16 can be a spherical shape, as shown in FIGS. 2A-2B. The metal reflector portion 16 can be at least one curved metal reflector 16, such as a plurality of curved metal reflector portions 16. The plurality of curved metal reflector portions 16 can be present in the layer 13. Each curved metal reflector portion 16 of the plurality of curved metal reflector portions 16 can be surrounded by at least one light valve 12.

The metal reflector portion 16 can be a metal and/or metal alloy. In an aspect, the material for the metal reflector portion 16 can include any materials that have reflective characteristics. An example of a reflector material can be aluminum, which has good reflectance characteristics, is inexpensive, and easy to form into or deposit as a thin layer. However, other reflector materials can also be used in place of aluminum. Non-limiting examples of material suitable for the metal reflector portion 16 include aluminum, zinc, steel, copper, silver, gold, platinum, palladium, nickel, cobalt, niobium, chromium, tin, and combinations or alloys of these or other metals, such as bronze, brass, and stainless steel. Other useful reflector materials include, but are not limited to, the transition and lanthanide metals and combinations thereof.

The article 10, as shown in the Figures, can include at least one color-rendering portion 14 in the layer 13. The at least one color-rendering portion 14 can be designed in dimension (size or shape or directionality) so long as visible color is provided to the article 10. For example, as shown in FIGS. 1A-1D, the color-rendering portion 14 can be a three-dimensional shape with flat polygon faces. In another aspect, as shown in FIGS. 2A-3E, the color-rendering portion 14 can be hourglass-shaped and/or flat on one-side and concave on another. In another aspect, as shown in FIGS. 4A-4D, the color-rendering portion 14 can be a three-dimensional spherical shape. For example, the color-rendering portion 14 can be a bead. In another aspect, the color-rendering portion 14 can be a continuous coating layer in which light valves 12 are distributed.

In an aspect, the at least one color-rendering portion 14 can be opaque, for example, white, black or any visible color. In an aspect, the at least one color-rendering portion 14 can include light absorbing materials or light scattering materials. The at least one color-rendering portion 14 can include at least one of dyes, pigments, and colorants. The color-rendering portion 14 can be white and can include, but is not limited to, $TiO_2$, $BaSO_4$, ZnS, white pigments, or white colorants. The color-rendering portion 14 can be black and can include, but is not limited to, carbon black, acid black 194, acid black 234, reactive black 8, reactive black 31, solvent black 5. The color-rendering portion 14 can be any pigment, such as an organic pigment, including, but not limited to, Pigment Red 254, Pigment Red 264, Pigment Blue 60, Pigment Blue 15, Pigment Orange 73, Pigment Yellow 194, Pigment Red 202, Pigment Red 122, Pigment Red 179, Pigment Red 170, Pigment Red 144, Pigment Red 177, Pigment Red 255, Pigment Brown 23, Pigment Yellow 109, Pigment Yellow 110, Pigment Yellow 147, Pigment Yellow 74, Pigment Yellow 83, Pigment Yellow 13, Pigment Yellow 191.1, Pigment Orange 61, Pigment Orange 71, Pigment Orange 48, Pigment Orange 49, Pigment Violet 23, Pigment Violet 37, Pigment Violet 19, Pigment Green 7, Pigment Green 36, and mixtures thereof. Non-limiting examples of inorganic pigments suitable for use in the color-rendering portion 14 include carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, and mixtures thereof. The at least one color-rendering portion 14 can be water insoluble.

Figure 3A:
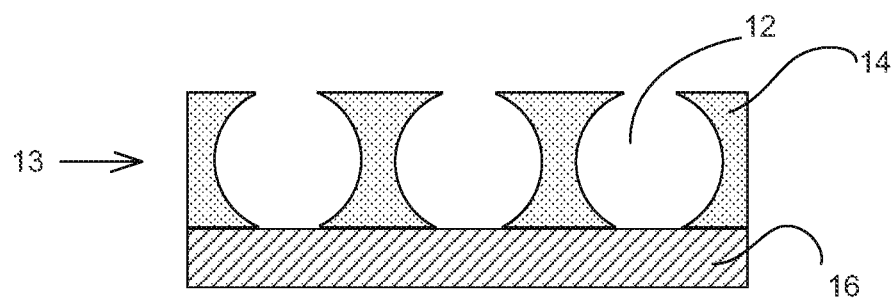
FIG. 3A is a cross-section of an article including at least one color-rendering portion and at least one light valve, according to another aspect of the present disclosure.
Figure 3B:
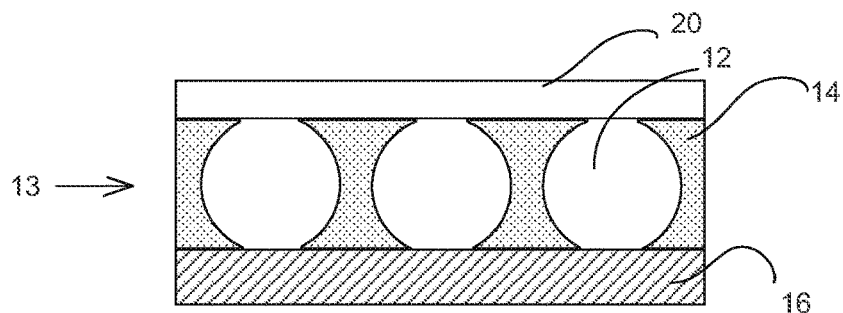
FIGS. 3B-3E are cross-sections of an article including a layer including at least one color-rendering portion and at least one light valve, according to another aspect of the present disclosure.
Figure 3C:
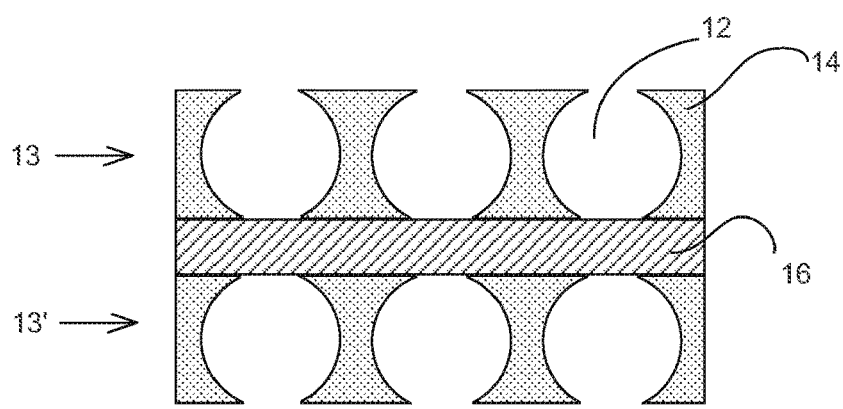
Figure 3D:
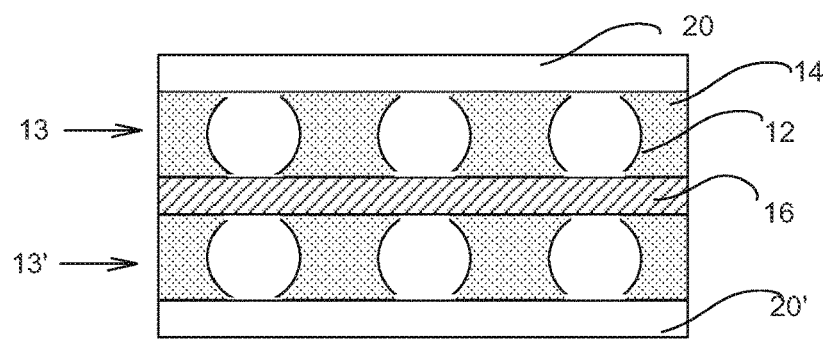
Figure 3E:
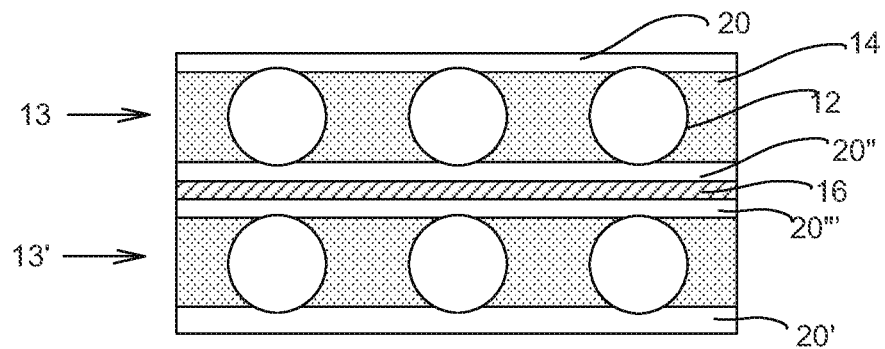

As shown in FIGS. 1C, 1D, 2B, 3B, 3D, 3E, 4B, and 4D, the article 10 can further include a transparent layer 20. The transparent layer 20 can be included on any exterior surface of the article 10. For example, as shown in FIGS. 1C, and 3E, the transparent layer 20 can be adjacent to the metal reflector portion 16 and, as shown in FIGS. 1D, 3B, 3D, 3E, 4B, and 4D the transparent layer 20 can be adjacent the layer 13. In an aspect, more than one transparent layer 20, 20', 20", and 20''' can be present in the article 10. The transparent layer 20 can provide a level surface to the article 10. The transparent layer 20 can be formed materials a clear resin, polyacrylates, polymethacrylates, polystyrene, polyvinyl acetate, polyurethanes, polyvinyl chloride, polyvinyl alcohol, polyesters, polycarbonates, polyamides, polyimides, silicones, epoxy resins, their copolymers, etc. The article 10 can include a layer 13, such as a first layer 13 and/or a second layer 13'. The first layer 13 can be the same or different from the second layer 13' in terms of color, dimension, type of materials, number of light valves 12, etc. As shown in FIGS. 1B, 3C-3E, and 4C-4D, the article 10 can include a first layer 13 and a second layer 13' with a metal reflector portion 16 therebetween. The layer 13 can include at least one color-rendering portion 14 and at least one light valve 12.

The layer 13 can be a selective light modulator layer (SLML). The SLML is a physical layer comprising a plurality of optical functions aiming at modulating (absorbing and or emitting) light intensity in different, selected regions of spectrum of electromagnetic radiation with wavelengths ranging from about 0.2 μm to about 20 μm. The SLML can selectively modulate light by means of absorption provided by a selective light modulator system (SLMS) (discussed in more detail below). In an aspect, the article 10 can include a SLML that selectively absorbs specific wavelengths of energy, such as light.

A SLML (and/or the materials within the SLML) can selectively modulate light. For example, an SLML can control the amount of transmission in specific wavelengths. In some examples, the SLML can selectively absorb specific wavelengths of energy (e.g., in the visible and/or non-visible ranges). For example, the SLML can be a "colored layer" and/or a "wavelength selective absorbing layer." In some examples, the specific wavelengths absorbed can cause the article to appear a specific color. For example, the SLML can appear red to the human eye (e.g., the SLML can absorb wavelengths of light below approximately 620 nm and thus reflect or transmit wavelengths of energy that appear red). This can be accomplished by adding selective light modulator particles (SLMP) that are colorants (e.g., organic and/or inorganic pigments and/or dyes,) to a host material, such as a dielectric material, including but not limited to a polymer. For example, in some instances, the SLML can be a colored plastic.

In some examples, some or all of the specific wavelengths absorbed can be in the visible range (e.g., the SLML can be absorbing throughout the visible, but transparent in the infrared). The resulting article would appear black, but reflect light in the infrared. In some examples described above, the wavelengths absorbed (and/or the specific visible color) of the article and/or SLML can depend, at least in part, on the thickness of the SLML. Additionally, or alternatively, the wavelengths of energy absorbed by the SLML (and/or the color in which these layers and/or the flake appears) can depend in part on the addition of certain aspects to the SLML. In addition to absorbing certain wavelengths of energy, the SLML can achieve at least one of bolstering a reflector portion against degradation; enabling release from a substrate; enabling sizing; providing some resistance to environmental degradation, such as oxidation of aluminum or other metals and materials used in a reflector portion; and high performance in transmission, reflection, and absorption of light based upon the composition and thickness of the SLML.

In some examples, in addition to or as an alternative to the SLML selectively absorbing specific wavelengths of energy and/or wavelengths of visible light, the SLML of the article can control the refractive index and/or the SLML can include selective light modulator particles (SLMPs) that can control refractive index. SLMPs that can control the refractive index of the SLML can be included with the host material in addition to or as an alternative to an absorption controlling SLMPs (e.g., colorants). In some examples, the host material can be combined with both absorption controlling SLMPs and refractive index SLMPs in the SLML. In some examples, the same SLMP can control both absorption and refractive index.

The performance of the SLML can be determined based upon the selection of materials present in the SLML. In an aspect, the SLML can improve at least one of the following properties: flake handling, corrosion, alignment, and environmental performance of any other layers within article.

The SLML (including each SLML present in an article, if multiple layers are present) can each independently comprise a host material alone, or a host material combined with a selective light modulator system (SLMS). In an aspect, at least one of the first SLML can include a host material. In another aspect, at least one of the first SLML can include a host material and a SLMS. The SLMS can include a selective light modulator molecule (SLMM), a selective light modulator particle (SLMP), an additive, or combinations thereof.

The composition of the SLML can have a solids content ranging from about 0.01% to about 100%, for example from about 0.05% to about 80%, and as a further example from about 1% to about 30%. In some aspects, the solids content can be greater than 3%. In some aspects, the composition of the SLML can have a solids content ranging from about 3% to about 100%, for example from about 4% to 50%.

The host material of the first SLML can independently be a film forming material applied as a coating liquid and serving optical and structural purposes. The host material can be used as a host (matrix) for introducing, if necessary, a guest system, such as the selective light modulator system (SLMS), for providing additional light modulator properties to the article.

The host material can be a dielectric material. Additionally, or alternatively, the host material can be at least one of an organic polymer, an inorganic polymer, and a composite material. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of inorganic polymers includes silanes, siloxanes, titanates, zirconates, aluminates, silicates, phosphazanes, polyborazylenes, and polythiazyls.

The first SLML can include from about 0.001% to about 100% by weight of a host material. In an aspect, the host material can be present in the SLML in an amount ranging from about 0.01% to about 95% by weight, for example from about 0.1% to about 90%, and as a further example from about 1% to about 87% by weight of the SLML.

The SLMS, for use in the SLML with the host material, can each independently comprise selective light modulator particles (SLMP), selective light modulator molecules (SLMM), additives, or a combination thereof. The SLMS can also comprise other materials. The SLMS can provide modulation of the amplitude of electromagnetic radiation (by absorption, reflectance, fluorescence etc.) in a selective region or the entire spectral range of interest (0.2 μm to 20 μm).

The first SLML can each independently include in an SLMS a SLMP. The SLMP can be any particle combined with the host material to selectively control light modulation, including, but not limited to color shifting particles, dyes, colorants include colorant includes one or more of dyes (such as phthalocyanine-based compounds), pigments, reflective pigments, color shifting pigments, quantum dots, and selective reflectors. Non-limiting examples of a SLMP include: organic pigments, inorganic pigments, quantum dots, nanoparticles (selectively reflecting and/or absorbing), micelles, etc. The nanoparticles can include, but are not limited to organic and metalorganic materials having a high value of refractive index (n>1.6 at wavelength of about 550 nm); metal oxides, such as $TiO_2$, $ZrO_2$, $In_2O_3$, $In_2O_3$—SnO, $SnO_2$, $Fe_xO_y$ (wherein x and y are each independently integers greater than 0), and $WO_3$; metal sulfides, such as ZnS, and $Cu_xS_y$ (wherein x and y are each independently integers greater than 0); chalcogenides, quantum dots, metal nanoparticles; carbonates; fluorides; and mixtures thereof.

Examples of a SLMM include but are not limited to: organic dyes, inorganic dyes, micelles, and other molecular systems containing a chromophore.

In some aspects, SLMS of the first SLML can include at least one additive, such as a curing agent, and a coating aid.

The curing agent can be a compound or material that can initiate hardening, vitrification, crosslinking, or polymerizing of the host material. Non-limiting examples of a curing agent include solvents, radical generators (by energy or chemical), acid generators (by energy or chemical), condensation initiators, and acid/base catalysts.

Non-limiting examples of the coating aid include leveling agents, wetting agents, defoamers, adhesion promoters, antioxidants, UV stabilizers, curing inhibition mitigating agents, antifouling agents, corrosion inhibitors, photosensitizers, secondary crosslinkers, and infrared absorbers for enhanced infrared drying. In an aspect, the antioxidant can be present in the composition of the SLML in an amount ranging from about 25 ppm to about 5% by weight.

The first SLML can each independently comprise a solvent. Non-limiting examples of solvents can include acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. In an aspect, the solvent can be present in the first SLML in an amount ranging from about 0% to about 99.9%, for example from about 0.005% to about 99%, and as a further example from about 0.05% to about 90% by weight relative to the total weight of the SLML.

In some examples, the first SLML can include a composition having at least one of (i) a photoinitiator, (ii) an oxygen inhibition mitigation composition, (iii) a leveling agent, and (iv) a defoamer.

The oxygen inhibition mitigation composition can be used to mitigate the oxygen inhibition of the free radical material. The molecular oxygen can quench the triplet state of a photoinitiator sensitizer or it can scavenge the free radicals resulting in reduced coating properties and/or uncured liquid surfaces. The oxygen inhibition mitigation composition can reduce the oxygen inhibition or can improve the cure of any SLML.

The oxygen inhibition composition can comprise more than one compound. The oxygen inhibition mitigation composition can comprise at least one acrylate, for example at least one acrylate monomer and at least one acrylate oligomer. In an aspect, the oxygen inhibition mitigation composition can comprise at least one acrylate monomer and two acrylate oligomers. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. In an aspect, the oxygen inhibition mitigation composition can include at least one acrylate oligomer, such as two oligomers. The at least one acrylate oligomer can be selected/chosen from a polyester acrylate and a polyether acrylate, such as a mercapto modified polyester acrylate and an amine modified polyether tetraacrylate. The oxygen inhibition mitigation composition can also include at least one monomer, such as 1,6-hexanediol diacrylate. The oxygen inhibition mitigation composition can be present in the first SLML in an amount ranging from about 5% to about 95%, for example from about 10% to about 90%, and as a further example from about 15% to about 85% by weight relative to the total weight of the SLML.

In some examples, the host material of the SLML can use a non-radical cure system such as a cationic system. Cationic systems are less susceptible to the mitigation of the oxygen inhibition of the free radical process, and thus may not require an oxygen inhibition mitigation composition. In an example, the use of the monomer 3-ethyl-3-hydroxymethyloxetane does not require an oxygen mitigation composition.

In an aspect, the first SLML can each independently include at least one photoinitiator, such as two photoinitiators, or three photoinitiators. The photoinitiator can be used for shorter wavelengths. The photoinitiator can be active for actinic wavelength. The photoinitiator can be a Type 1 photoinitiator or a Type II photoinitiator. The SLML can include only Type I photoinitiators, only Type II photoinitiators, or a combination of both Type I and Type II photoinitiators. The photoinitiator can be present in the composition of the SLML in an amount ranging from about 0.25% to about 15%, for example from about 0.5% to about 10%, and as a further example from about 1% to about 5% by weight relative to the total weight of the composition of the SLML.

The photoinitiator can be a phosphineoxide. The phosphineoxide can include, but is not limited to, a monoacyl phosphineoxide and a bis acyl phosphine oxide. The mono acyl phosphine oxide can be a diphenyl (2,4,6-trimethylbenzoyl)phosphineoxide. The bis acyl phosphine oxide can be a bis (2,4,6-trimethylbenzoyl)phenylphosphineoxide. In an aspect, at least one phosphineoxide can be present in the composition of the SLML. For example, two phosphineoxides can be present in the composition of the SLM.

A sensitizer can be present in the composition of the SLML and can act as a sensitizer for Type 1 and/or a Type II photoinitiators. The sensitizer can also act as a Type II photoinitiator. In an aspect, the sensitizer can be present in the composition of the SLML in an amount ranging from about 0.05% to about 10%, for example from about 0.1% to about 7%, and as a further example from about 1% to about 5% by weight relative to the total weight of the composition of the SLML. The sensitizer can be a thioxanthone, such as 1-chloro-4-propoxythioxanthone.

In an aspect, the SLML can include a leveling agent. The leveling agent can be a polyacrylate. The leveling agent can eliminate cratering of the composition of the SLML. The leveling agent can be present in the composition of the SLML in an amount ranging from about 0.05% to about 10%, for example from about 1% to about 7%, and as a further example from about 2% to about 5% by weight relative to the total weight of the composition of the SLML.

The first SLML can also include a defoamer. The defoamer can reduce surface tension. The defoamer can be a silicone free liquid organic polymer. The defoamer can be present in the composition of the SLML in an amount ranging from about 0.05% to about 5%, for example from about 0.2% to about 4%, and as a further example from about 0.4% to about 3% by weight relative to the total weight of the composition of the SLML.

The first SLML can each independently have a refractive index of greater or less than about 1.5. For example, each SLML can have a refractive index of approximately 1.5. The refractive index of each SLML can be selected to provide a degree of color travel required wherein color travel can be defined as the change in hue angle measured in L*a*b* color space with the viewing angle. In some examples, each SLML can include a refractive index in a range of from about 1.1 to about 3.0, about 1.0 to about 1.3, or about 1.1 to about 1.2. In some examples, the refractive index of each SLML can be less than about 1.5, less than about 1.3, or less than about 1.2. In some examples, SLML can have substantially equal refractive indexes or different refractive indexes one from the other, if more than one SLML is present in the article.

The SLML can have a thickness ranging from about 1 nm to about 10000 nm, about 10 nm to about 1000 nm, about 20 nm to about 500 nm, about 1 nm, to about 100 nm, about 10 nm to about 1000 nm, about 1 nm to about 5000 nm. In an aspect, the article, such as an optical device, can have an aspect ratio of 1:1 to 1:50 thickness to width.

One of the benefits of the article described herein, however, is that, in some examples, the optical effects appear relatively insensitive to thickness variations. Thus, in some aspects, each SLML can independently have a variation in optical thickness of less than about 5%. In an aspect, each SLML can independently include an optical thickness variation of less than about 3% across the layer. In an aspect, each SLML can independently have less than about 1% variation in optical thickness across the layer having a thickness of about 50 nm.

Figure 1D:
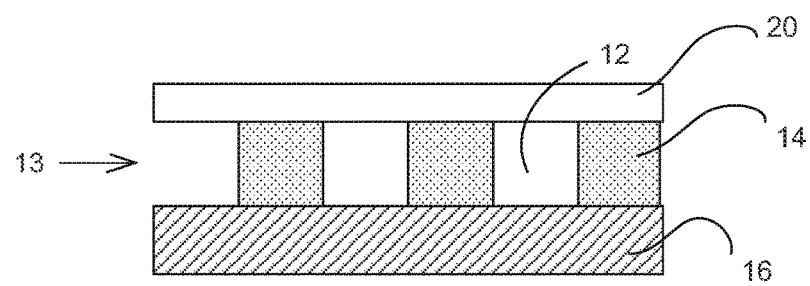

FIGS. 1A-1D illustrates an article 10 including a layer 13 including at least one color-rendering portion 14 and a least one light valve 12; and a metal reflector portion 16; wherein the at least one light valve 12 is positioned in the layer 13 to provide reflection of incident light through the at least one light valve 12. The layer 13 can be a first layer 13 and a second layer 13', as shown in FIG. 1B. In an aspect, the at least one color-rendering portion 14 can be opaque, for example white, black, or any color in the spectrum therebetween. Each of the first and second layers 13, 13' can include at least one light valve 12. For example, each of the first and second layers 13, 13' can include a plurality of light valves 12. The metal reflector portion 16 is positioned between both of the first and second layer 13, 13' so that incident light can enter light valves 12 present in either first and second layers 13, 13'. FIGS. 1A, 1C, and 1D illustrate an asymmetrical article 10. FIG. 1B illustrated a symmetrical article 10. This can enable an article, such as a special effect pigment, to exhibit metallic sheen regardless of which side, i.e., first layer 13 or second layer 13' is facing away from a substrate coated with the article 10. FIGS. 1C and 1D illustrate an article 10 with a transparent layer 20, which can be located on at least one external surface of the article, such as either the layer 13 and/or the metal reflector portion 16.

FIGS. 2A-2B illustrate an article 10 including a layer 13 including at least one color-rendering portion 14 and at least one light valve 12; and a metal reflector portion 16. The at least one light valve 12 can be positioned between the color-rendering portion 14 and the metal reflector portion 16, such as an at least one curved metal reflector portion 16. The at least one light valve 12 can be a void area that surrounds and/or encapsulates the at least one curved metal reflector portion 16. A thickness of the at least one light valve 12 can vary. A thin light valve 12 surrounding the at least one curved metal reflector 16 can allow less incident light to pass through the light valve 12. A thicker light valve 12 surrounding the at least one curved metal reflector 16 can allow more incident light to pass through the light valve 12. In an aspect, the at least one curved metal reflector 16 and/or the at least one light valve 12 can extend beyond a surface of the layer 13. In another aspect, the at least one curved metal reflector portion 16 can extend through more than one surface of the layer 13. For example, the at least one curved metal reflector 16 can extend through a portion of a top surface of the layer 13. As a further example, the at least one curved metal reflector 16 can extend through a portion of a top and bottom surface of the layer 13. As shown in FIG. 2B, the article 10 can further include a transparent layer 20 as an external surface of the article 10. A transparent layer 20 can be present as every external surface of the article 10.

As shown in FIGS. 2A-2B, the at least one curved metal reflector 16 can include one or more, such as a plurality of, curved metal reflectors 16 in the layer 13. If more than one curved metal reflector 16 is present in the layer 13, then at least one curved metal reflector 16 can be encompassed and/or surrounded by at least one light valve 12. The at least one-color-rendering portion 14 can be opaque.

FIGS. 3A-3E illustrate an article 10 including a layer 13 including at least one color-rendering portion 14 and a least one light valve 12; and a metal reflector portion 16; wherein the at least one light valve 12 is positioned in the layer 13 to provide reflection of incident light through the at least one light valve 12. The at least one color-rendering portion 14 can be opaque. The layer 13 can be a first 13 and a second layer 13' with a metal reflector portion 16 positioned between them, as shown in FIGS. 3C-3E. The at least one light valve 12 can include a transparent material. The transparent material can be a transparent bead. The transparent bead can be polystyrene or silica. A diameter of the transparent bead can extend beyond a surface of the layer 13, such as the first layer 13 and the second layer 13'. In particular, the at least one light valve 12 can be a bead having a diameter approximately equal to or larger than a height (thickness) of a layer 13, such as a first layer 13 and/or a second layer 13'. In an aspect, the transparent bead can be dissolved leaving a void area as the at least one light valve 12. The article 10 can also include a transparent layer 20 on an external surface of the article, as shown in FIGS. 3B, 3D, and 3E. FIG. 3E also illustrates a transparent layer 20, such as a third transparent layer 20" and a fourth transparent layer 20'" between the metal reflector portion 16 and the first and second layers 13, 13', respectively.

If more than one transparent layer 20 is present in the article 10, then each transparent layer 20, 20', 20", and 20'" can be the same or different, for example, in terms of composition, thickness, etc. Non-limiting examples of suitable transparent material for use in the transparent layer 20 include a clear resin, polyacrylates, polymethacrylates, polystyrene, polyvinyl acetate, polyurethanes, polyvinyl chloride, polyvinyl alcohol, polyesters, polycarbonates, polyamides, polyimides, silicones, epoxy resins, their copolymers, etc. In an aspect, incident light can pass through the transparent layer 20 and into the at least one light valve 12 in order to be reflected by the metal reflector portion 16.

Figure 4A:
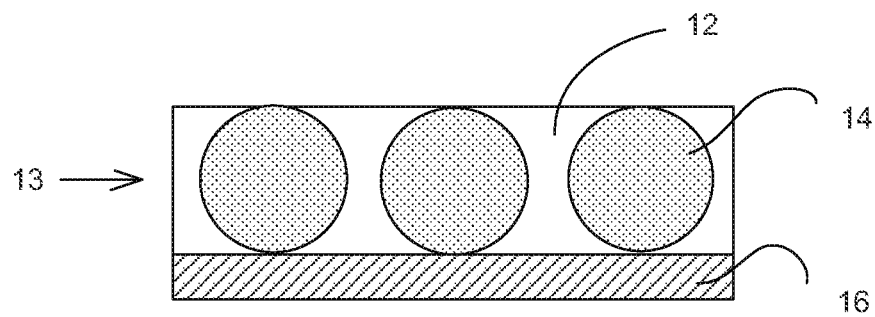
FIG. 4A is a cross-section of an article including a layer including at least one color-rendering portion and at least one light valve, according to an aspect of the present disclosure.
Figure 4B:
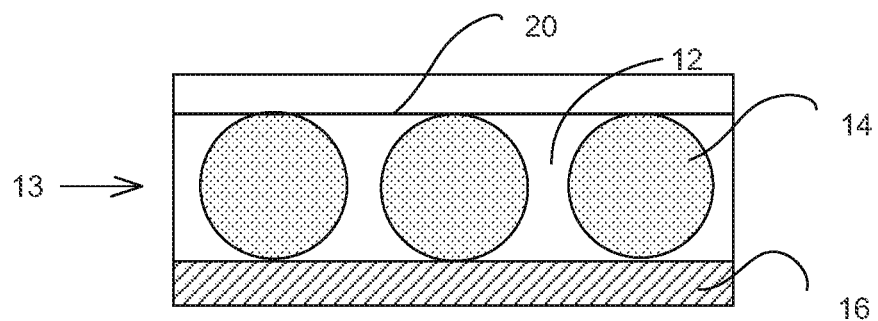
FIGS. 4B-4D are cross-sections of an article including a layer including at least one color-rendering portion and at least one light valve, according to another aspect of the present disclosure.
Figure 4C:
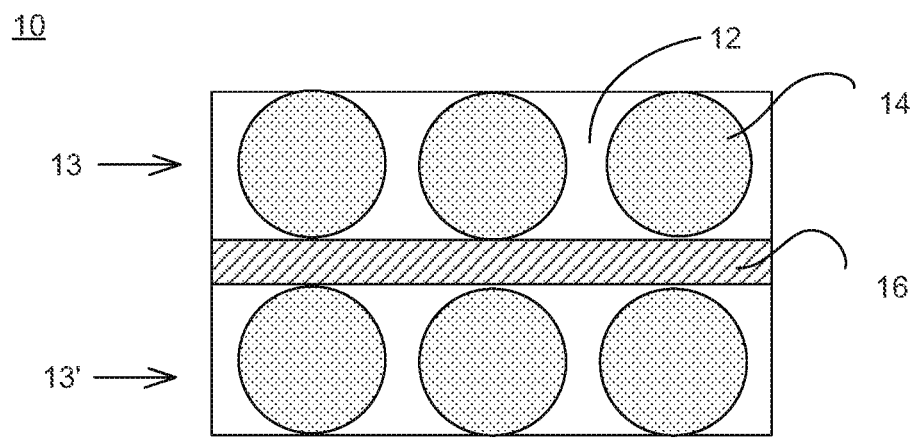
Figure 4D:
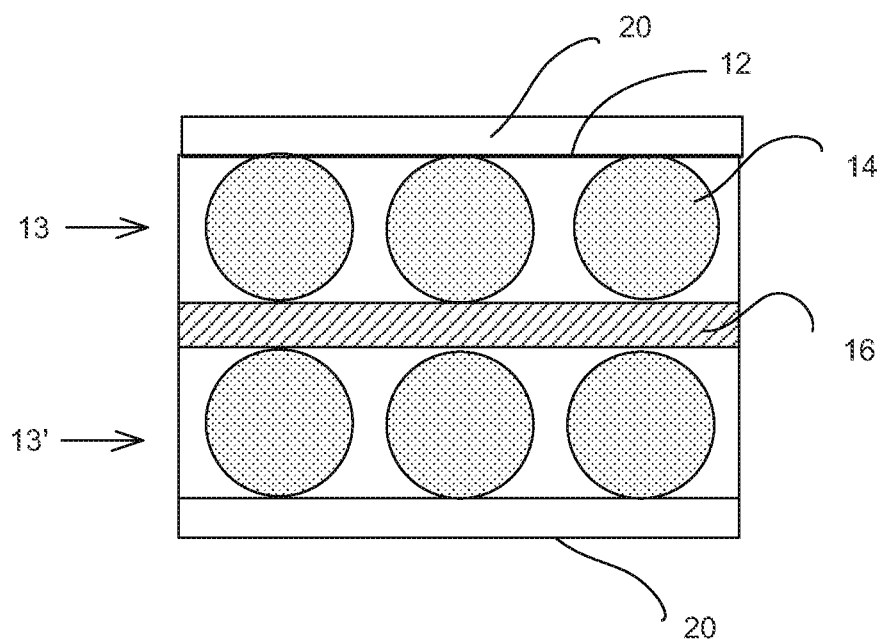

FIGS. 4A-4D illustrate an article 10 including a layer 13 including at least one color-rendering portion 14 and a least one light valve 12; and a metal reflector portion 16; wherein the at least one light valve 12 is positioned in the layer 13 to provide reflection of incident light through the at least one light valve 12. The layer 13 can be a first layer 13 and a second layer 13', as shown in FIGS. 4C-4D. In an aspect, the at least one color-rendering portion 14 can be opaque, for example white, black, or any color in the spectrum therebetween. The at least one color-rendering portion 14 can be beads. Each of the first and second layers 13, 13' can include a plurality of color-rendering portions 14 spaced throughout the layers 13, 13'. Each of the first and second layers 13, 13' include at least one light valve 12. For example, each of the first and second layers 13, 13' include a plurality of light valves 12. The metal reflector portion 16 can be positioned between both of the first and second layer 13, 13' so that incident light can enter light valves 12 present in either first and second layers 13, 13'. The article 10 can be asymmetrical, as shown in FIGS. 4A and 4B, or can be symmetrical, as shown in FIGS. 4C and 4D. A symmetrical article 10, such as a special effect pigment, can exhibit metallic sheen regardless of which side, i.e., first layer 13 or second layer 13' is facing away from a substrate coated with the article 10.

FIGS. 4B and 4D illustrate an article 10 further including a transparent layer 20, such as first, second, third, and fourth transparent layers 20, 20', 20", and 20'". The transparent layer can also be present on either side of the metal reflector portion 16.

In an aspect, the article 10, such as an optical device in the form of a flake, foil or sheet, can also include a substrate and/or a release layer. In an aspect, the release layer can be disposed between a substrate and the article 10. The substrate can be made of a flexible material. The substrate can be any suitable material that can receive layers deposited during the manufacturing process. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc. The substrate can vary in thickness, but can range for example from about 2 µm to about 100 µm, and as a further example from about 10 to about 50 µm.

Additionally, or alternatively, the article 10, in the form of a flake, sheet, or foil, can also include a hard coat or protective layer. In some examples, these layers (hard coat or protective layer) do not require optical qualities.

The article 10, such as optical devices, described herein can be made in any way. For example, successive layers can be deposited forming a sheet, which can then be divided, broken, ground, etc. into smaller pieces thereby forming an article 10. In some examples, the sheet can be created by a liquid coating process, alone or in combination with deposition techniques.

There is disclosed a method for manufacturing an article 10, for example in the form of a sheet, flake, or foil, as described herein. The method can include successively depositing layers onto the substrate to form the article 10. The deposited layers can include one or more of the following layers in any order: a layer 13 including at least one color-rendering portion 14 and at least one light valve 12 (such as a selective light modulator layer), a reflector portion 16, a magnetic layer, a dielectric stack, a transparent layer 20, and an absorber layer.

The method can comprise coating a first layer 13 having at least one color-rendering portion 14 and at least one light valve 12 onto a substrate, for example using a liquid coating process. A metal reflector portion 16 can be deposited onto the first layer 13. In the disclosed methods, the metal reflector portion 16 can be deposited using deposition process, such as physical vapor deposition, chemical vapor deposition, thin-film deposition, atomic layer deposition, etc., including modified techniques such as plasma enhanced and fluidized bed. This method A second layer 13' including at least one color-rendering portion 14 and at least one light valve 12 can be coated onto the metal reflector portion 16. As previously discussed, the first layer 13 and the second layer 13' can be the same or different.

The layer 13, such as a first layer 13 and a second layer 13', can be deposited by a liquid coating process, such as a slot die process. The liquid coating process can include, but is not limited to: slot-bead, slide bead, slot curtain, slide curtain, in single and multilayer coating, tensioned web slot, gravure, roll coating, and other liquid coating and printing processes that apply a liquid on to a substrate or previously deposited layer to form a liquid layer or film that is subsequently dried and/or cured.

The substrate can be released from the deposited layers (including, but not limited to a reflector portion 16, and layer 13) to create the article 10. In an aspect, the substrate can be cooled to embrittle an associated release layer, if present. In another aspect, the release layer could be embrittled for example by heating and/or curing with photonic or e-beam energy, to increase the degree of cross-linking, which would enable stripping. The deposited layers can then be stripped mechanically, such as sharp bending or brushing of the surface. The released and stripped layers can be sized into article 10, such as an optical device in the form of a flake, foil, or sheet, using known techniques.

In another aspect, the deposited layers can be transferred from the substrate to another surface. The deposited layers can be punched or cut to produce large flakes with well-defined sizes and shapes.

The liquid coating process can allow for the transfer of the composition of the SLML (such as the layer 13) at a faster rate as compared to other deposition techniques, such as vapor deposition. Additionally, the liquid coating process can allow for a wider variety of materials to be used in the SLML with a simple equipment set up. It is believed that the SLML formed using the disclosed liquid coating process can exhibit improved optical performance.

A liquid coating process can include inserting into a slot die a composition of a layer, e.g. SLML (a liquid coating composition) and depositing the composition on a substrate resulting in a wet film. With reference to the processes disclosed above, the substrate can include at least one of a substrate, a release layer, a reflector layer, and previously deposited layers. The distance from the bottom of the slot die to the substrate is the slot gap G. The liquid coating composition can be deposited at a wet film thickness D that is greater than a dry film thickness H. After the wet film of the liquid coating composition has been deposited on the substrate, any solvent present in the wet film of the liquid coating composition can be evaporated. The liquid coating process continues with curing of the wet film of the liquid coating composition to result in a cured, self-leveled layer having the correct optical thickness H (ranging from about 30 to about 700 nm). It is believed that the ability of the liquid coating composition to self-level results in a layer having a reduced optical thickness variation across the layer. Ultimately, an article, such as an optical device, comprising the self-leveled liquid coating composition can exhibit increased optical precision. For ease of understanding, the terms "wet film" and "dry film" will be used to refer to the liquid coating composition at various stages of the liquid coating process.

The liquid coating process can comprise adjusting at least one of a coating speed and a slot gap G to achieve a wet film with a predetermined thickness D. The liquid coating composition can be deposited having a wet film thickness D ranging from about 0.1 µm to about 500 µm, for example from about 0.1 µm to about 5 µm. The liquid coating composition formed with a wet film thickness D in the disclosed range can result in a stable SLML layer, such as a dielectric layer, i.e., without breaks or defects such as ribbing or streaks. In an aspect, the wet film can have a thickness of about 10 µm for a stable wet film using a slot die bead mode with a coating speed up to about 100 m/min. In another aspect, the wet film can have a thickness of about 6-7 µm for a stable wet film using a slot die curtain mode with a coating speed up to about 1200 m/min.

The liquid coating process can include a ratio of slot gap G to wet film thickness D of about 1 to about 100 at speeds from about 0.1 to about 1000 m/min. In an aspect, the ratio is about 9 at a coating speed of about 100 m/min. In an aspect, the ratio can be about 20 at a coating speed of about 50 m/min. The liquid coating process can have a slot gap G ranging from about 0 to about 1000 µm. A smaller slot gap G can allow for a reduced wet film thickness. In slot-bead mode higher coating speeds can be achieved with a wet film thickness greater than 10 µm.

The liquid coating process can have a coating speed ranging from about 0.1 to about 1000 m/min, for example from about 25 m/min to about 950 m/min, for example from about 100 m/min to about 900 m/min, and as a further example from about 200 m/min to about 850 m/min. In an aspect, the coating speed is greater than about 150 m/min, and in a further example is greater than about 500 m/min.

In an aspect, the coating speed for a bead mode liquid coating process can range from about 0.1 m/min to about 600 m/min, and for example from about 50 to about 150 m/min. In another aspect, the coating speed for a curtain mode liquid coating process can range from about 200 m/min to about 1500 m/min, and for example, from about 300 m/min to about 1200 m/min.

The solvent can be evaporated from the wet film, such as before the wet film is cured. In an aspect, about 100%, for example about 99.9%, and as a further example about 99.8% of the solvent can be evaporated from the liquid coating composition prior to curing of the liquid coating composition. In a further aspect, trace amounts of solvent can be present in a cured/dry liquid coating composition. In an aspect, a wet film having a greater original weight percent of solvent can result in a dry film having a reduced film thickness H. In particular, a wet film having a high weight percent of solvent and being deposited at a high wet film thickness D can result in a liquid coating composition, such as the SLML having a low dry film thickness H. It is important to note, that after evaporation of the solvent, the wet film remains a liquid thereby avoiding problems such as skinning, and island formation during the subsequent curing steps in the liquid coating process.

The dynamic viscosity of the wet film can range from about 0.5 to about 50 cP, for example from about 1 to about 45 cP, and as a further example from about 2 to about 40 cP. The viscosity measurement temperature is 25° C. The rheology was measured with an Anton Paar MCR 101 rheometer equipped with a solvent trap using a cone/plate 40 mm diameter with 0.3° angle at a gap setting of 0.025 mm.

In an aspect, the liquid coating composition and the solvent can be selected so that the wet film exhibits Newtonian behavior for precision coating of the liquid coating composition using the liquid coating process. The wet film can exhibit Newtonian behavior shear rates up to 10,000 $s^{-1}$ and higher. In an aspect, the shear rate for the liquid coating process can be 1000 $s^{-1}$ for a coating speed up to 25 m/min, for example 3900 $s^{-1}$ for a coating speed up to 100 m/min, and as a further example 7900 $s^{-1}$ for a coating speed up to 200 m/min. It will be understood that a maximum shear rate can occur on a very thin wet film, such as 1 μm thick.

As the wet film thickness is increased, the shear rate can be expected to decrease, for example decrease 15% for a 10 μm wet film, and as a further example decrease 30% for a 20 μm wet film.

The evaporation of the solvent from the wet film can cause a change in viscosity behavior to pseudoplastic, which can be beneficial to achieve a precision SLML. The dynamic viscosity of the deposited SLML after any solvent has been evaporated, can range from about 10 cP to about 3000 cP, for example from about 20 cP to about 2500 cP, and as a further example from about 30 cP to about 2000 cP. When evaporating the solvent, if present, from the wet film there can be an increase in viscosity to the pseudoplastic behavior. The pseudoplastic behavior can allow for self-leveling of the wet film.

In an aspect, the method can include evaporating the solvent present in the wet film using known techniques. The amount of time required to evaporate the solvent can be dependent upon the speed of the web/substrate and the dryer capacity. In an aspect, the temperature of the dryer (not shown) can be less than about 120° C., for example less than about 100° C., and as a further example less than about 80° C.

The wet film deposited using a liquid coating process can be cured using known techniques. For example, the disclosed methods can further include curing or hardening the coated first layer 13 before depositing the metal reflector portion 16. In another aspect, the method can further include curing or hardening the coated second layer 13'. In an aspect, the wet film, i.e., an SLML such as the layer 13, can be cured using a curing agent utilizing at least one of an ultraviolet light, visible light, infrared, or electron beam. Curing can proceed in an inert or ambient atmosphere. In an aspect, the curing step utilizes an ultraviolet light source having a wavelength of about 395 nm. The ultraviolet light source can be applied to the wet film at a dose ranging from about 200 mJ/cm² to about 1000 mJ/cm², for example ranging from about 250 mJ/cm² to about 900 mJ/cm², and as a further example from about 300 mJ/cm² to about 850 mJ/cm².

The wet film can crosslink by known techniques. Non-limiting examples include photoinduced polymerization, such as free radical polymerization, spectrally sensitized photoinduced free radical polymerization, photoinduced cationic polymerization, spectrally sensitized photoinduced cationic polymerization, and photoinduced cycloaddition; electron beam induced polymerization, such as electron beam induced free radical polymerization, electron beam induced cationic polymerization, and electron beam induced cycloaddition; and thermally induced polymerization, such as thermally induced cationic polymerization.

A SLML formed using the liquid coating process can exhibit improved optical performance, i.e., be a precision SLML. In some examples, a precision SLML can be understood to mean a SLML having less than about 3% optical thickness variation, about 5% optical thickness variation, or about 7% optical thickness variation across the layer.

In an aspect, the liquid coating process can include adjusting at least one of speed from about 5 to about 100 m/min and a coating gap from about 50 μm to about 100 μm to deposit a wet film from about 2 μm to 10 μm of the selective light modulator layer with a predetermined thickness from about 500 nm to about 1500 nm. In a further aspect, the process can include a speed of 30m/min, a 75 um gap, 10 um wet film, dry film thickness 1.25 um.

In the disclosed method, the at least one light valve 12 can be a bead, and the method can further include dissolving the bead to form a void area in the layer 13. The method can also include filling the void area with a transparent material, which can be the same or different transparent material used to form the disclosed transparent layer 20.

In an aspect, the method can further include coating a first transparent layer 20 between the substrate and the first layer 13. The method can also further include coating a second transparent layer 20' onto the coated second layer 13'. The method can further include coating a third transparent layer 20" between the first layer 13 and the metal reflector portion 16. The method can further include coating a fourth transparent layer 20''' between the second layer 13' and the metal reflector portion 16.

The first and second layers 13, 13' can be cured and/or cross-linked as disclosed above before any additional layers are deposited on them. The first and second layers 13, 13' can be coated using the disclosed liquid coating processes. The transparent layers 20, 20', 20", and 20''', and the metal reflector portion 16 can be deposited using the disclosed deposition techniques. The transparent layers 20, 20', 20", and 20''' can be coated using a liquid coating process. The transparent layers can provide a smooth outer surface to the article 10. In yet another aspect, the method can further include coating a third transparent layer 20" between the first layer 13 and the metal reflector portion 16. The method can further include coating a fourth transparent layer 20''' between the second layer 13' and the metal reflector portion 16.

In an aspect, the at least one light valve 12 present in the first and second layers 13, 13' can be a bead having a diameter equal to or larger than a height (thickness) of the first and second layers 13, 13'.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An article, comprising:
    a valve layer including at least one color-rendering portion and at least one light valve, wherein the valve layer is a selective light modulator layer (SLML); and
    a metal reflector portion;
    wherein the at least one light valve is positioned in the valve layer to provide reflection of incident light through the at least one light valve, and wherein the at least one light valve comprises at least one of a round-shaped void or a dissolvable bead, wherein the round-shaped void is formed when the dissolvable bead is dissolved.

2. The article of claim 1, wherein article includes only a single valve layer.

3. The article of claim 1, wherein at least one color-rendering portion is opaque.

4. The article of claim 1, wherein the at least one color-rendering portion comprises light absorbing or light scattering materials.

5. The article of claim 1, wherein the at least one color-rendering portion comprises at least one of dyes and colorants.

6. The article of claim 1, wherein the selective light modulator layer (SLML) includes at least one selective light modulator particle (SLMP) to assist in controlling at least one of absorption or refractive index.

7. The article of claim 1, wherein the at least one light valve is dimensioned to allow incident light to pass through the at least one light valve.

8. The article of claim 1, wherein the at least one light valve is a void area in the valve layer.

9. The article of claim 1, wherein the at least one light valve is an optical pathway through which incident light reaches the metal reflector portion.

10. The article of claim 1, wherein the at least one light valve is a plurality of light valves spaced throughout the valve layer.

11. The article of claim 1, wherein the at least one light valve is a three-dimensional shape with flat polygonal faces.

12. The article of claim 1, wherein the at least one light valve is a three-dimensional round shape.

13. The article of claim 1, wherein the at least one light valve can be at least the same height as the valve layer.

14. The article of claim 1, wherein a portion of the at least one light valve can extend above a surface of the valve layer.

15. The article of claim 1, wherein the at least one light valve is a bead comprised of transparent material with a defined geometry.

16. The article of claim 15, wherein a diameter of the bead is greater than or equal to a height of the valve layer.

17. The article of claim 1, wherein the metal reflector portion is at least one curved metal reflector.

18. A method for making an article, comprising:
    coating a valve layer having at least one light valve and at least one color-rendering portion onto a substrate, wherein the at least one light valve comprises at least one of a round-shaped void or a dissolvable bead, wherein the round-shaped void is formed when the dissolvable bead is dissolved; and
    depositing a metal reflector portion onto the valve layer, wherein the valve layer is a selective light modulator layer (SLML).

19. The method of claim 18, further comprising curing or hardening the coated valve layer before depositing the metal reflector portion.

20. The method of claim 18, wherein the at least one light valve is a bead; and the method further comprises dissolving the bead to form a void area; and filling the void area with a transparent material.

21. The method of claim 18, further comprising coating a first transparent layer, the first transparent layer being on the valve layer when the article is completed.

* * * * *